United States Patent
Mahajan (10) Patent No.: US 11,396,911 B2
(45) Date of Patent: Jul. 26, 2022

(54) BEARING ARRANGEMENTS, TRANSMISSION ASSEMBLIES, AND METHODS OF MAKING BEARING ARRANGEMENTS FOR TRANSMISSION ASSEMBLIES

(71) Applicant: Hamilton Sundstrand Corporation, Charlotte, NC (US)

(72) Inventor: Prasad Sunilrao Mahajan, Maharashtra (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 219 days.

(21) Appl. No.: 16/797,698

(22) Filed: Feb. 21, 2020

(65) Prior Publication Data
US 2021/0190138 A1 Jun. 24, 2021

(30) Foreign Application Priority Data
Dec. 20, 2019 (IN) .............................. 201911053185

(51) Int. Cl.
*F16C 35/063* (2006.01)
*F16C 35/04* (2006.01)
(Continued)

(52) U.S. Cl.
CPC ............ *F16C 35/063* (2013.01); *F16B 2/065* (2013.01); *F16C 19/12* (2013.01); *F16C 35/045* (2013.01);
(Continued)

(58) Field of Classification Search
CPC .......... F16C 19/06; F16C 19/12; F16C 19/26; F16C 35/063; F16C 35/045;
(Continued)

(56) References Cited

U.S. PATENT DOCUMENTS 1,294,792 A * 2/1919 Gray ..................... F16C 35/063
403/261
1,418,379 A 6/1922 Karle
(Continued)

FOREIGN PATENT DOCUMENTS

CN 107461421 A * 12/2017 ............. B60K 17/24
CN 107795588 A * 3/2018 ............. B60K 17/24
(Continued)

OTHER PUBLICATIONS

European Search Report for Application No. 20215810.1, dated May 26, 2021, 8 pages.

*Primary Examiner* — James Pilkington
(74) *Attorney, Agent, or Firm* — Cantor Colburn LLP (57) ABSTRACT

A bearing arrangement includes a rotary member, a bearing, and a clamp member. The rotary member is arranged along a rotation axis and has a collar portion, the collar portion extending radially outward from the rotary member. The bearing extends about the rotary member and axially abuts the collar portion, the bearing arranged to support the rotary member for rotation about the rotation axis. The clamp member is seated on the rotary member and on a side of the bearing opposite the collar portion, the clamp member urging the bearing axially toward the collar portion to axially fix the bearing relative to the rotary member. Transmission assemblies and methods of making bearing arrangements are also described.

14 Claims, 7 Drawing Sheets

(51) Int. Cl.
*F16B 2/06* (2006.01)
*F16C 19/12* (2006.01)

(52) U.S. Cl.
CPC ...... *F16C 2226/10* (2013.01); *F16C 2226/16* (2013.01)

(58) Field of Classification Search
CPC .............. F16C 2226/10; F16C 2226/16; F16C 2300/02; F16C 2326/06; F16C 2326/43; F16L 23/08; F16L 3/127; F16D 1/0817; F16B 21/186; F16B 2/065; B60K 17/24
USPC .................. 384/445, 513, 536–539, 541; 385/365–367, 419; 411/517; 403/374.1; D8/396
See application file for complete search history.

(56) References Cited

U.S. PATENT DOCUMENTS

| | | | |
|---|---|---|---|
| 2,584,740 A * | 2/1952 | Reynolds | F16D 1/0817 403/350 |
| 3,305,199 A * | 2/1967 | Bayes | F16L 3/127 248/74.1 |
| 3,600,770 A | 8/1971 | Halling | |
| 3,643,520 A * | 2/1972 | Andrushkiw | F16H 63/36 74/333 |
| 4,019,824 A | 4/1977 | Percy | |
| 4,189,251 A | 2/1980 | Bianco | |
| 5,030,018 A | 7/1991 | Korenblit | |
| 5,596,790 A * | 1/1997 | Moller | F16L 33/03 24/20 EE |
| 5,681,118 A * | 10/1997 | Armstrong | F16C 35/063 384/513 |
| 6,200,223 B1 | 3/2001 | Martens | |
| 6,464,268 B1 * | 10/2002 | Hough | F16L 23/08 285/367 |
| 9,383,047 B2 | 7/2016 | Alexander et al. | |
| 9,863,564 B2 * | 1/2018 | Sato | F16L 23/08 |

FOREIGN PATENT DOCUMENTS

| | | | | |
|---|---|---|---|---|
| CN | 109019378 A | * | 12/2018 | ............ F16C 35/063 |
| CN | 109139717 A | * | 1/2019 | ............ F16C 35/078 |
| DE | 102005036789 A1 | * | 2/2007 | ............ B60K 17/24 |
| DE | 102010010638 A1 | | 9/2011 | |
| DE | 102017219831 A1 | * | 5/2019 | ......... F16C 35/0635 |
| KR | 200349895 Y1 | * | 5/2004 | ............ F16C 35/063 |
| WO | WO-03081063 A2 | * | 10/2003 | ............ F16C 35/063 |
| WO | 2011110457 A1 | | 9/2011 | |

* cited by examiner

BEARING ARRANGEMENTS, TRANSMISSION ASSEMBLIES, AND METHODS OF MAKING BEARING ARRANGEMENTS FOR TRANSMISSION ASSEMBLIES

CROSS-REFERENCE TO RELATED APPLICATIONS

This application claims the benefit of Indian Patent Application No. 201911053185 filed Dec. 20, 2019, the disclosure of which is incorporated herein by reference in its entirety.

BACKGROUND

The present disclosure is generally related to bearings arrangements, and more particularly to axial fixation of bearings in bearing arrangements.

Rotary drives, such as in transmissions for flight control surface actuators on aircraft, commonly employ bearings to support drive shafts for communicating rotation to the driven device. The bearings generally limit movement of the shaft to rotation relative to static structure. In some rotary drives it can be necessary to axially fix the bearing along the drive shaft, such as with a cup washer and keeper nut arrangement. Such arrangements typically axially fix the bearing against a stop defined along the drive shaft by advancing the keeper nut against the bearing along threads defined on the drive shaft, advancement of the keeper nut deforming the cup washer, deformation of the cup washer preventing the keeper nut from backing off. Upon advancement of keeper nut fully, the cup washer is deformed intentionally in such a way that deformed material of cup washer sits within the groove/slot defined on the keeper nut. This restricts (or prevents entirely) rotation of the keeper nut, preventing the keeper nut from backing off such that the keeper nut retains the bearing in its axial position. Once the keeper nut is tightened the keeper nut/cup washer arrangement retains the bearing in an axially fixed location along the drive shaft.

While generally acceptable for their intended purpose, the deformation of the cup washer generally requires that the cup washer be replaced in the event that bearing structure is generally removed from the shafting. Further, the threads and/or slots defined within the shafting tend to concentrate stress at the respective features. This can require that the shafting be larger than otherwise required for the application and/or that the shafting be inspected and/or replaced at certain service intervals, adding cost to the actuated device employing the bearing structure Such bearing arrangements and rotary actuators have generally been acceptable for their intended purpose. However, there remains a need for improved bearing arrangements, transmission assemblies for flight control surfaces on aircraft, and methods of making bearing arrangements for flight control surfaces on aircraft.

BRIEF DESCRIPTION

A bearing arrangement is provided. The bearing arrangement includes a rotary member arranged along a rotation axis and having a collar portion, the collar portion extending radially outward from the rotary member; a bearing extending about the rotary member and axially abutting the collar portion, the bearing configured to support the rotary member for rotation about the rotation axis; and a clamp member seated on the rotary member and on a side of the bearing opposite the collar portion, the clamp member urging the bearing axially toward the collar portion to axially fix the bearing relative to the rotary member.

In addition to one or more of the features described above, or as an alternative, further embodiments of the bearing arrangement include a bearing cap extending about the bearing for fixation of the bearing arrangement to static structure.

In addition to one or more of the features described above, or as an alternative, further embodiments of the bearing arrangement include that the bearing cap has a bearing cap flange portion extending radially outward from the rotation axis, axially overlapping the clamp member, and about the rotary member.

In addition to one or more of the features described above, or as an alternative, further embodiments of the bearing arrangement include that the bearing cap has a fastener pattern defined therein for fixation of the bearing arrangement to a static structure.

In addition to one or more of the features described above, or as an alternative, further embodiments of the bearing arrangement include that the collar portion is a first collar portion and the rotary member defines a second collar portion, and that the second collar portion spaced apart from the first collar portion by the bearing and the clamp member.

In addition to one or more of the features described above, or as an alternative, further embodiments of the bearing arrangement include that the rotary member defines no threads between the first collar portion and the second collar portion.

In addition to one or more of the features described above, or as an alternative, further embodiments of the bearing arrangement include that the rotary member defines a tapered portion and a bearing seat portion between the first collar portion and the second collar portion, the tapered portion spaced apart from the first collar portion by the bearing seat portion, the tapered portion narrowing in width in a direction toward the first collar portion.

In addition to one or more of the features described above, or as an alternative, further embodiments of the bearing arrangement include that the bearing is seated on the bearing seat portion of the rotary member, and that the clamp member is seated on the tapered portion of the rotary member.

In addition to one or more of the features described above, or as an alternative, further embodiments of the bearing arrangement include that the rotary member has a splined end and a forked end, wherein the bearing is arranged between the splined end and the forked end.

In addition to one or more of the features described above, or as an alternative, further embodiments of the bearing arrangement include a driven device including flight control surface connected to one of the splined end and the forked end of the rotary member.

In addition to one or more of the features described above, or as an alternative, further embodiments of the bearing arrangement include a drive device connected to one of the splined end and the forked end of the rotary member.

In addition to one or more of the features described above, or as an alternative, further embodiments of the bearing arrangement include that the clamp member has a one-piece clamp body with a first tine and a second tine, the first tine fastened to the second tine of the one-piece clamp body.

In addition to one or more of the features described above, or as an alternative, further embodiments of the bearing arrangement include that the clamp member has a hinged two-piece clamp body or a two-piece clamp body including a first segment and a second segment, the first segment of the hinged two-piece clamp body or the two-piece clamp body fastened to the second segment of the hinged two-piece clamp body or the two-piece clamp body.

In addition to one or more of the features described above, or as an alternative, further embodiments of the bearing arrangement include that the clamp member has a first tine flange and a circumferentially opposite second tine flange, the first tine flange and the second tine flange extending radially from the clamp member, the second tine flange of the clamp member fastened to the first tine flange of the clamp member.

A transmission assembly is also provided. The transmission assembly includes a bearing arrangement as described above. The collar portion is a first collar portion and the rotary member defines a second collar portion. The second collar portion is spaced apart from the first collar portion by the bearing and the clamp member and a bearing cap extends about the bearing for fixation of the bearing arrangement to static structure, the bearing arrangement being a steady bearing arrangement.

In addition to one or more of the features described above, or as an alternative, further embodiments of the transmission assembly can include that the rotary member has a splined end and a forked end, the transmission assembly further including a drive device connected to one of the splined end and the forked end of the rotary member, the drive device including an electric or a hydraulic motor, and a driven device connected to the other of the splined end and the forked end of the rotary member, the driven device including a flight control surface for an aircraft.

In addition to one or more of the features described above, or as an alternative, further embodiments of the transmission assembly can include that the rotary member has a splined end and a forked end, the bearing arranged between the splined end and the forked end, the second collar portion is axially spaced apart from the first collar portion by the bearing and the clamp member, the rotary member defines no threads between the first collar portion and the second collar portion, and the rotary member defines a tapered portion and a bearing seat portion between the first collar portion and the second collar portion, the tapered portion spaced apart from the first collar portion by the bearing seat portion.

A method of making a bearing arrangement is additionally provided. The method includes arranging a rotary member along a rotation axis, the rotary member having a collar portion extending radially outward from the rotary member; seating a bearing about the rotary member such that the bearing axially abutting the collar portion, the bearing configured for supporting the rotary member for rotation about the rotation axis; seating a clamp member on the rotary member and on a side of the bearing opposite the collar portion; and urging the clamp member axially toward the collar portion to axially fix the bearing relative to the rotary member.

In addition to one or more of the features described above, or as an alternative, further embodiments of the method may include urging the bearing axially toward the collar portion includes fastening a first segment of the clamp member to a second segment of the clamp member.

In addition to one or more of the features described above, or as an alternative, further embodiments of the method may include urging the bearing axially toward the collar portion includes driving the clamp member axially toward the bearing with a tapered portion of the rotary member.

Technical effects of the present disclosure include the capability to axially fix bearings relative to rotatable members without single-use components. Technical effects of the present disclosure also include the bearing arrangements having few (or no) stress concentration features defined along the rotatable member associated with the features employed to axially fix the bearing relative the rotatable member, extending service life and/or reducing size and weight of the rotating components. Technical effects of the present disclosure additionally include simplified fabrication of the rotatable members employed in bearing arrangements by limiting (or eliminating entirely) the need to cut threads and/or mill slots within the rotatable member for axially fixing bearing to rotatable members.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
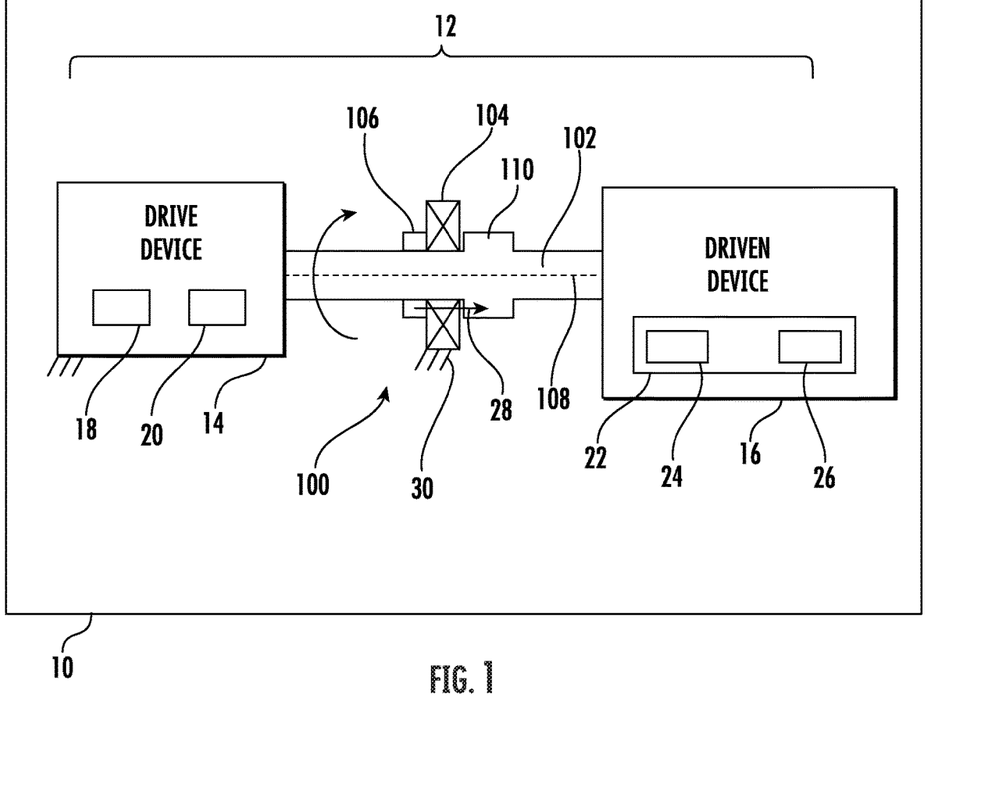
FIG. 1 is a schematic view of a bearing arrangement constructed in accordance with the present disclosure, a bearing axially fixed along a rotary member to communicate rotation between a drive device and a driven device.

Reference will now be made to the drawings wherein like reference numerals identify similar structural features or aspects of the subject disclosure. For purposes of explanation and illustration, and not limitation, a partial view of an example of a bearing arrangement constructed in accordance with the disclosure is shown in FIG. 1 and is designated generally by reference character 100. Other embodiments of bearing arrangements, transmission assemblies for actuated flight control surfaces, and methods of making bearing arrangements are provided in FIGS. 2-9, as will be described. The systems and methods described herein can be used for supporting rotating members, such as rotating members employed in transmission assemblies for actuated flight control surface in aircraft, though the present disclosure is not limited to transmission assemblies for actuated flight control devices or to aircraft in general.

Referring to FIG. 1, a vehicle 10, e.g., an aircraft, is shown. The vehicle 10 includes a transmission assembly 12 including the bearing arrangement 100, a drive device 14, and a driven device 16. The bearing arrangement 100 operably connects the drive device 14 to the driven device 16. In certain examples the drive device 14 includes a hydraulic motor 18 or an electric motor 20. In accordance with certain examples the driven device 16 includes a flight control surface 22. It is contemplated that the flight control surface 22 can be defined by a flap structure 24 or a slat structure 26. Although the bearing arrangement 100 is shown in FIG. 1 and described herein in the context of actuated flight control surface of an aircraft it is to be understood and appreciated that other drive device/driven devices can also benefit from the present disclosure.

The bearing arrangement 100 generally includes a rotary member 102, a bearing 104, and a clamp member 106. The rotary member 102 is arranged along a rotation axis 108 and has a collar portion 110 extending radially outward from the rotary member 102. The bearing 104 extends about the rotary member 102, axially abuts the collar portion 110, and is configured to support the rotary member 102 for rotation about the rotation axis 108. The clamp member 106 is seated on the rotary member 102 on a side of the bearing 104 opposite the collar portion 110 of the rotary member 102, the clamp member 106 urging, e.g., exerting an axial force component 28, pressing the bearing 104 axially toward the collar portion 110 of the rotary member 102 to axially fix the bearing 104 relative to the rotary member 102.

Figure 2:
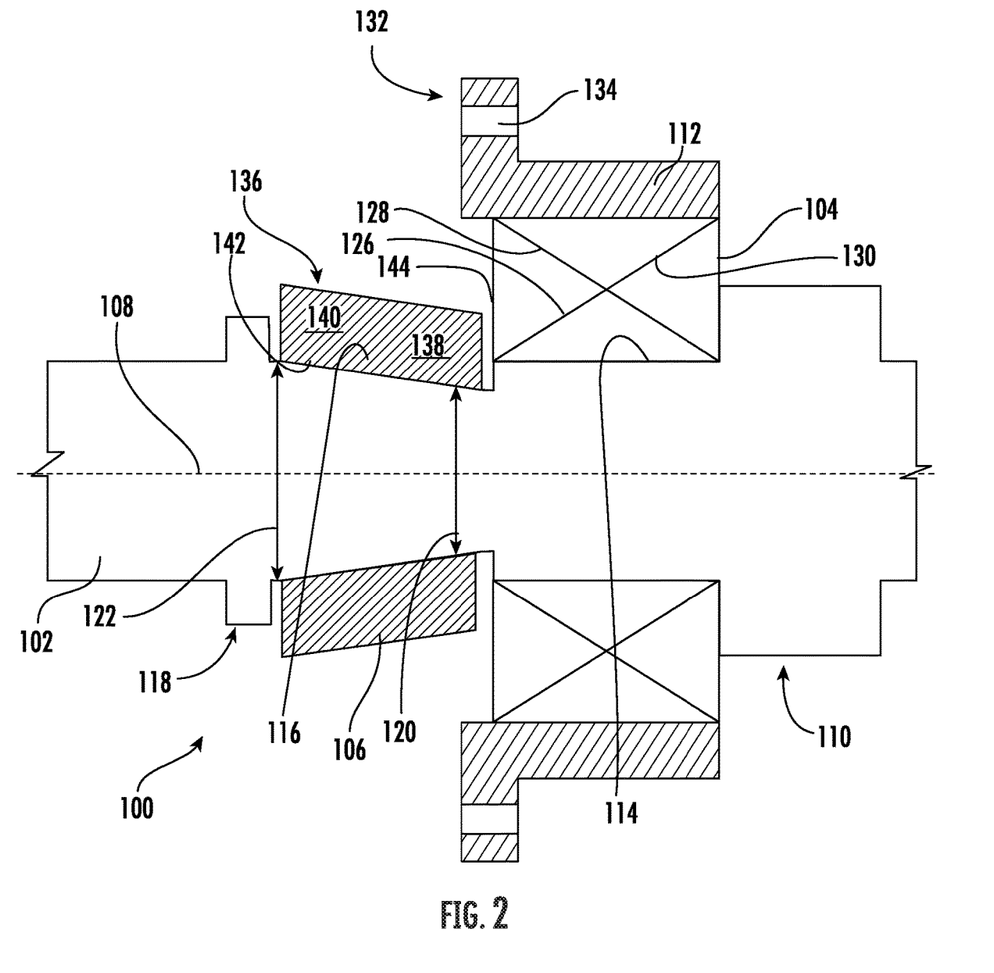
FIG. 2 is cross-sectional view of the bearing arrangement of FIG. 1 according to an example, showing the clamp member seated on a tapered portion of the rotary member to axially fix the bearing along the rotary member between the clamp member and a collar portion of the rotary member.

With reference to FIG. 2, the bearing arrangement 100 is shown according to an example. The bearing arrangement 100 includes the rotary member 102, the bearing 104, the clamp member 106, and a bearing cap 112.

In the illustrated example the collar portion 110 is a first collar portion 110 and the rotary member 102 has a bearing seat portion 114, a tapered portion 116, and a second collar portion 118. The bearing seat portion 114 is axially adjacent to the first collar portion 110, separates the tapered portion 116 from the first collar portion 110, and is configured to seat thereon the bearing. The tapered portion 116 is axially adjacent to the bearing seat portion 114, separates the second collar portion 118 from the bearing seat portion 114, and is configured to seat thereon the clamp member 106. In this respect the rotary member 102 defines a first width 120 and the second width 122 bounding the tapered portion 116, the second width being greater than the first width 120 such that tightening the clamp member 106 about the tapered portion 116 causes the clamp member 106 to exert the axial force component against the bearing 104 as per wedging principle. The second collar portion 118 is arranged on a side of the rotary member 102 axially opposite the first collar portion 110, the second collar portion 118 spaced apart from the first collar portion 110 by the bearing seat portion 114 and the tapered portion 116.

The bearing 104 is seated about the bearing seat portion 114 and radially between the rotary member 102 and the bearing cap 112. It is contemplated that the bearing 104 include an inner race 126, an outer race 128, and a plurality of roller elements 130 radially interposed between the inner race 126 and the outer race 128. The inner race 126 extends about the rotary member 102, is fixed in rotation relative to the rotary member 102, and axially fixed to the bearing seat portion 114 between the first collar portion 110 and the tapered portion 116 of the rotary member 102. The plurality of roller elements 130 are distributed circumferentially about the rotary member 102 between the inner race 126 and the outer race 128. The outer race 128 is arranged radially between the bearing cap 112 and the plurality of roller elements 130 and is fixed in rotation relative to the bearing cap 112. In certain examples the bearing 104 includes a radial bearing assembly. In accordance with certain examples the bearing 104 includes a ball bearing assembly. It is also contemplated that, in accordance with certain examples, the bearing 104 can be included in a steady bearing arrangement. As will be appreciated by those of skill in the art in view of the present disclosure, the steady bearing arrangement limits (or prevents entirely) the drive member, opposes axial force components associated with intervening gearboxes, and/or limits (or prevents entirely) drive member movements associated with wing flexure.

The bearing cap 112 is configured for fixation of the bearing arrangement 100 to static structure, e.g., the static structure 30 (shown in FIG. 1). In this respect the bearing cap 112 is arranged radially outward of the bearing 104, extends circumferentially about the rotary member 102, and has a bearing cap flange portion 132. The bearing cap flange portion 132 axially overlaps the clamp member 106 to limit axial length of the bearing arrangement 100. In certain examples the bearing cap flange portion 132 defines therethrough a fastener pattern 134, which conforms the bearing arrangement 100 in fit and form to certain legacy bearing arrangements. Conforming the bearing arrangement 100 in fit and form to certain legacy bearing arrangements in turn allow the bearing arrangement 100 to serve as spare and/or an upgrade to such legacy bearing arrangements.

The clamp member 106 is configured to urge the bearing 104 axially toward the first collar portion 110. In this respect the clamp member 106 seats on the tapered portion 116 of the rotary member 102 such that, when tightened about the tapered portion 116, the clamp member 106 translates axially toward the bearing 104. Translation of the clamp member 106 against the first collar portion 110 compresses the bearing 104 against the first collar portion 110, axially fixing the bearing 104 relative to the rotary member 102. As illustrated in FIG. 2 the clamp member 106 defines a clamp member cross-sectional profile 136 having a thick portion 138 and a thin portion 140. The thick portion 138 opposes (abuts) the bearing 104 and the thin portion 140 opposes (and is spaced apart from) the second collar portion 118 of the rotary member 102. In certain examples a clamp member-to-rotary member surface 142 is oblique relative to a clamp member-to-bearing surface 144.

In certain examples the rotary member 102 has no threads between the first collar portion 110 and the second collar portion 118. For example, the outer surface of the rotary member 102 can be smooth between the first collar portion 110 and the second collar portion 118 of the rotary member 102. Absence of threads limits (or eliminates entirely) stress concentration features on the surface of the rotary member 102, improving service life of the rotary member 102 and/or allowing the rotary member 102 to be relatively lightweight. In accordance with certain examples the rotary member 102 has no longitudinal slotting between the first collar portion 110 and the second collar portion 118, e.g., as slot made on rotary member required for deformable cup washers, also limiting (or eliminating entirely) stress concentration effects on the surface of the rotary member 102 to improve service life of the rotary member 102 and/or allow the rotary member 102 to be relatively lightweight and/or reduce the cost associated with machining slot on the rotary member 102.

Figure 3:
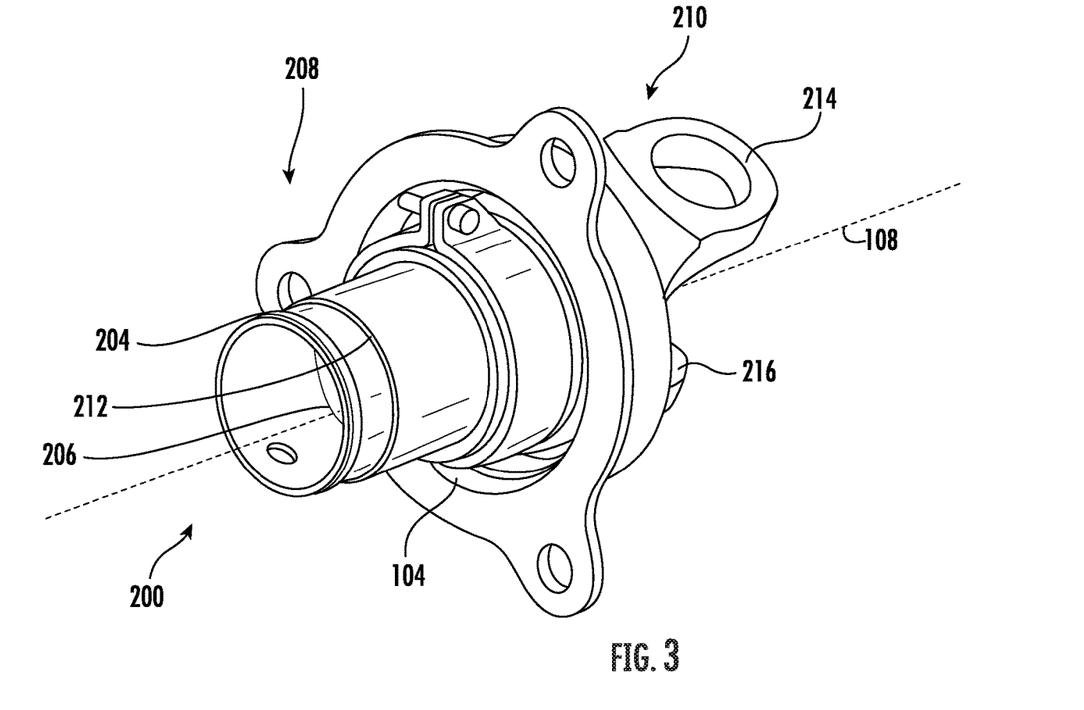
FIGS. 3 and 4 are perspective views of the clamp member and the bearing arrangement of FIG. 1 according to another example, showing a clamp member with a one-piece clamp body axially fixing the bearing along the rotary member.
Figure 4:
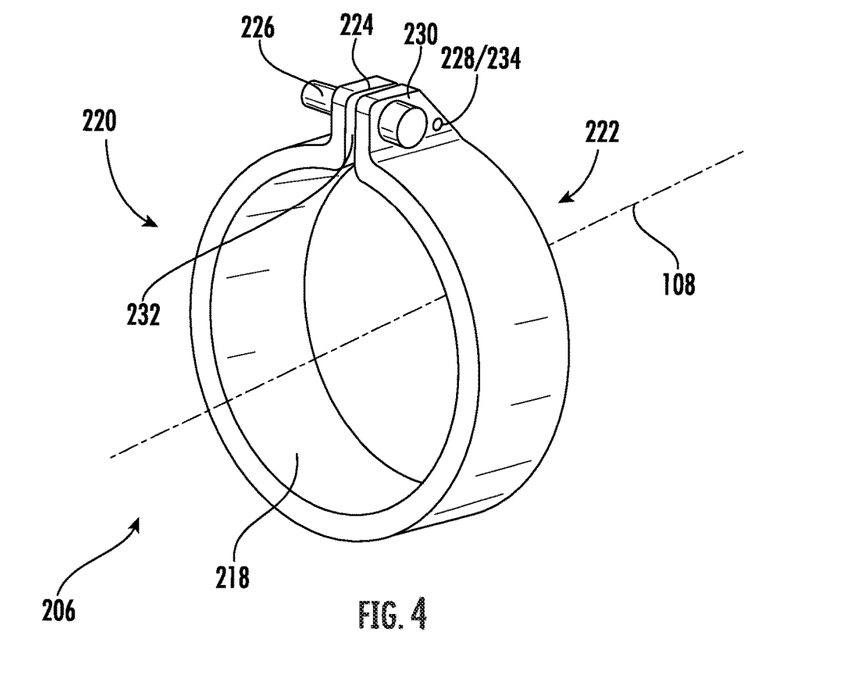

With reference to FIGS. 3 and 4, a bearing arrangement 200 is shown. As shown in FIG. 3, the bearing arrangement 200 is similar to the bearing arrangement 100 (shown in FIG. 1) and additionally includes a rotary member 204 and a clamp member 206. The rotary member 204 is similar to the rotary member 102 (shown in FIG. 1) and additionally has a splined end 208 and a forked end 210. The splined end 208 has a spline feature 212 and is configured to connect the bearing arrangement 200 to one of the drive device 14 (shown in FIG. 1) and the driven device 16 (shown in FIG. 1). The forked end 210 has a first tine 214 and a second tine 216 radially spaced apart from one another and extending axially along the rotation axis 108, the forked end 210 configured to connect the bearing arrangement to the other of the drive device 14 and the driven device 16.

As shown in FIG. 4, the clamp member 206 has a one-piece body 218 having a first tine 220 and a second tine 222. The first tine 220 has an arcuate shape on its radially inner surface conforming to the contour of the tapered portion 116 (shown in FIG. 2) of the rotary member 204 and terminates at a first tine flange 224. The first tine flange 224 extends radially from the first tine 220 and is arranged to receive there a fastener 226. In certain examples the first tine flange 224 has an anti-rotation feature 228, such as recess conforming to tool-engagement faces of the fastener 226 or a wire lock for rotational fixation of the fastener 226 relative to the first tine flange 224, to limit (or prevent entirely) the fastener 226 from loosening during service.

The second tine 222 mirrors the first tine 220 about the rotation axis 108, has an arcuate shape on its radially inner surface conforming to the contour of the tapered portion 116 (shown in FIG. 2) of the rotary member 204 (shown in FIG. 3), and terminates at a second tine flange 230. The second tine flange 230 extends radially from the second tine 222, is spaced apart from the first tine flange 224 by a circumferential gap 232 and is arranged to receive there the fastener 226. In certain examples the second tine flange 230 has an anti-rotation feature 234, such as recess conforming to tool-engagement faces of the fastener 226 or a wire lock for rotational fixation of the fastener 226 relative to the second tine flange 230, to limit (or prevent entirely) the fastener 226 from loosening during service.

With continuing reference to FIGS. 3 and 4, tightening the fastener 226 drives the second tine flange 230 toward the first tine flange 224, reducing (or closing entirely) the circumferential gap 232 defined between the second tine flange 230 and the first tine flange 224. Reducing (or closing entirely) the circumferential gap 232 reduces diameter of the one-piece body 218 and causes the clamp member 206 to translate axially along the tapered portion 116 (shown in FIG. 2) until the clamp member 206 axially abuts the bearing 104. Once the clamp member 206 comes into axial abutment with the bearing 104 further tightening of the fastener 226 causes the clamp member 206 to exert the axial force component 28 (shown in FIG. 1) on the bearing 104, the clamp member 206 thereby axially fixing the bearing 104 between the clamp member 206 and the first collar portion 110 (shown in FIG. 2) of the rotary member 204.

Figure 5:
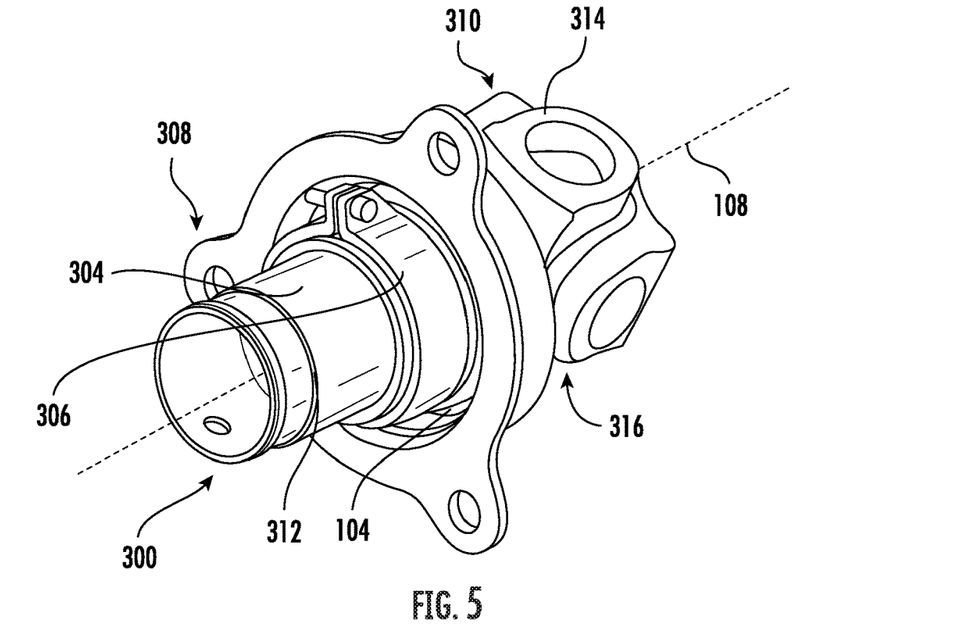
FIGS. 5 and 6 are perspective views of the clamp member and the bearing arrangement of FIG. 1 according to an additional example, showing a clamp member with a hinged two-piece clamp body axially fixing the bearing along the rotary member.
Figure 6:
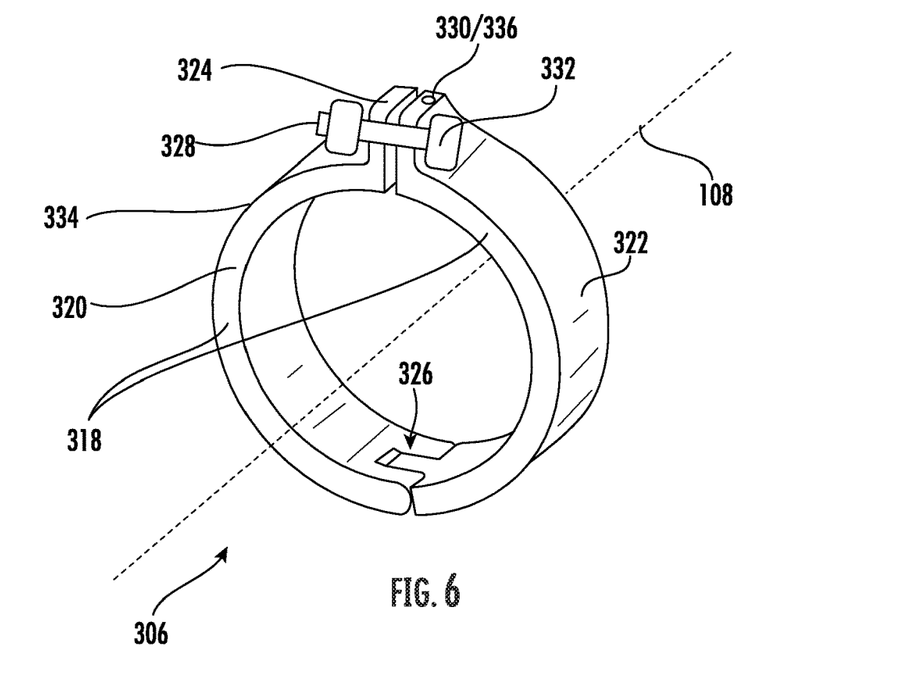

With reference to FIGS. 5 and 6, a bearing arrangement 300 is shown. As shown in FIG. 5, the bearing arrangement 300 is similar to the bearing arrangement 100 (shown in FIG. 1) and additionally includes a rotary member 304 and a clamp member 306. The rotary member 304 is similar to the rotary member 102 (shown in FIG. 1) and additionally has a splined end 308 and a forked end 310. The splined end 308 has a spline feature 312 and is configured to connect the bearing arrangement 300 to one of the drive device 14 (shown in FIG. 1) and the driven device 16 (shown in FIG. 1). The forked end 310 has a first tine 314 and a second tine 316 radially spaced apart from one another and extending axially along the rotation axis 108, the forked end 310 configured to connect the bearing arrangement to the other of the drive device 14 and the driven device 16.

As shown in FIG. 6, the clamp member 306 has a two-piece body 318 including a first segment 320 and a second segment 322. The first segment 320 has an arcuate shape on its radially inner surface conforming to the contour of the tapered portion 116 (shown in FIG. 2) of the rotary member 304 and terminates at opposite ends at first segment flange 324 and a hinged joint 326. The first segment flange 324 extends radially from the first segment 320 and is arranged to receive there a fastener 328. In certain examples the first segment flange 324 has an anti-rotation feature 330, such as recess conforming to tool-engagement faces of the fastener 328 or a wire lock for rotational fixation of the fastener 328 relative to the first segment flange 324, to limit (or prevent entirely the fastener 328 from loosening during service.

The second segment 322 mirrors the first segment 320 about the rotation axis 108, has an arcuate shape on its radially inner surface also conforming to the contour of the tapered portion 116 (shown in FIG. 2) of the rotary member 304 (shown in FIG. 5), and terminates at opposite ends at second segment flange 332 and a hinged joint 326. The second segment flange 332 extends radially from the second segment 322, is spaced apart from the first segment flange 324 by a circumferential gap 334 and is arranged to receive there the fastener 328. In certain examples the second segment flange 332 has an anti-rotation feature 336, such as recess conforming to tool-engagement faces of the fastener 328 or a wire lock for rotational fixation of the fastener 328 relative to the second segment flange 332, to limit (or prevent entirely) the fastener 328 from loosening during service.

With continuing reference to FIGS. 5 and 6, the hinged joint 326 allows the clamp member 306 to be removed and replaced without disconnecting the rotary member 304 from the drive device 14 (shown in FIG. 1) and/or the driven device 16 (shown in FIG. 1), e.g., for inspection of the bearing 104. Upon placement on the tapered portion 116 (shown in FIG. 2) of the rotary member 304 tightening the fastener 328 drives the second segment flange 332 toward the first segment flange 324, reducing (or closing entirely) the circumferential gap 334 defined between the second segment flange 332 and the first segment flange 324. Reducing (or closing entirely) the circumferential gap 334 reduces diameter of the two-piece body 318, causing the clamp member 306 to translate axially along the tapered portion 116 of the rotary member 304 until the clamp member 306 axially abuts the bearing 104. Once the clamp member 306 comes into axial abutment with the bearing 104 further tightening of the fastener 328 causes the clamp member 306 to exert the axial force component 28 (shown in FIG. 1) on the bearing 104, the clamp member 306 thereby axially fixing the bearing 104 between the clamp member 306 and the first collar portion 110 (shown in FIG. 2) of the rotary member 304.

Figure 7:
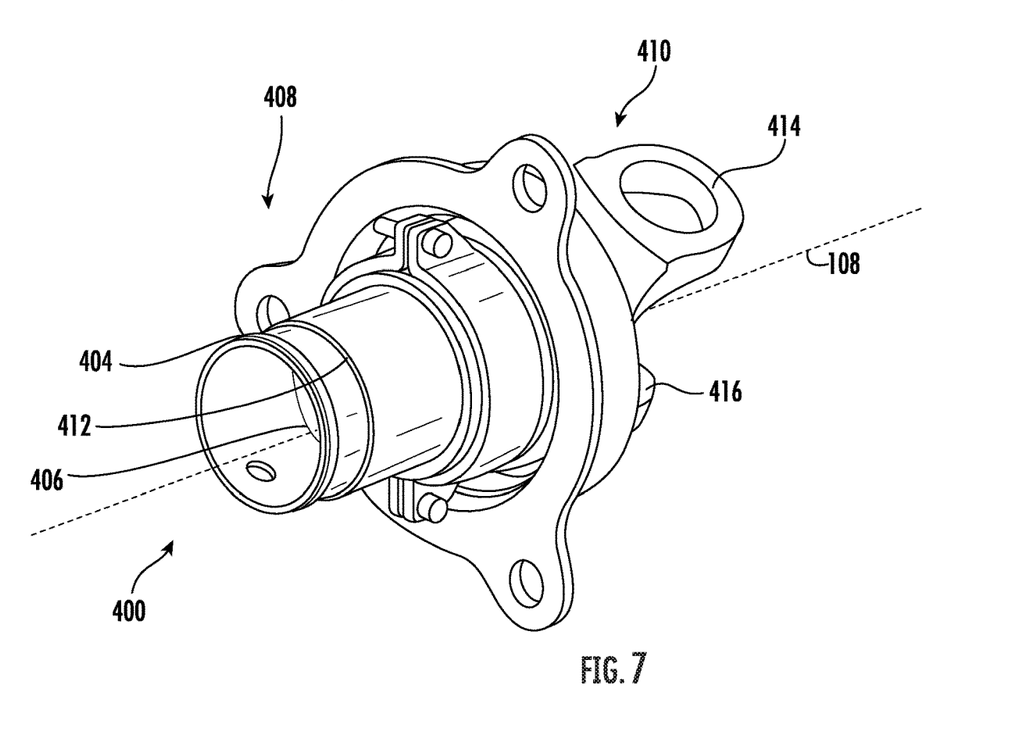
FIGS. 7 and 8 are perspective views of the clamp member and the bearing arrangement of FIG. 1 according to yet another example, showing a clamp member with a severed two-piece clamp body axially fixing the bearing along the rotary member.
Figure 8:
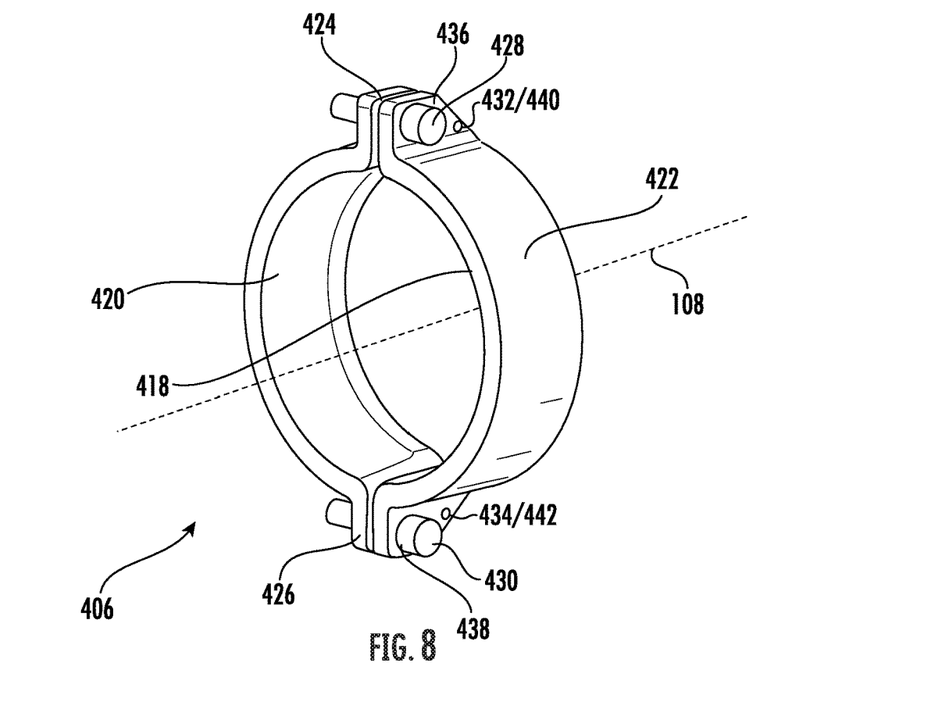

With reference to FIGS. 7 and 8, a bearing arrangement 400 is shown. As shown in FIG. 7, the bearing arrangement 400 is similar to the bearing arrangement 100 (shown in FIG. 1) and additionally includes a rotary member 404 and a clamp member 406. The rotary member 404 is similar to the rotary member 102 (shown in FIG. 1) and additionally has a splined end 408 and a forked end 410. The splined end 408 has a spline feature 412 and is configured to connect the bearing arrangement 400 to one of the drive device 14 (shown in FIG. 1) and the driven device 16 (shown in FIG. 1). The forked end 410 has a first tine 414 and a second tine 416 radially spaced apart from one another and extending axially along the rotation axis 108, the forked end 410 configured to connect the bearing arrangement to the other of the drive device 14 and the driven device 16.

As shown in FIG. 8, the clamp member 406 has a two-piece body 418 including a first segment 420 and a second segment 422. The first segment 420 has an arcuate shape on its radially inner surface conforming to the contour of the tapered portion 116 (shown in FIG. 2) and terminates at opposite ends at first segment first flange 424 and a first segment second flange 426. The first segment first flange 424 extends radially from the first segment 420 and is arranged to receive there a first fastener 428. The first segment second flange 426 extends radially from the first segment 420 in a direction opposite the first segment first flange 424 and is arranged to receive there a second fastener 430. In certain examples the first segment first flange 424 has an anti-rotation feature 432, such as recess conforming to tool-engagement faces of the first fastener 428 or a wire lock for rotational fixation of the first fastener 428 relative to the first segment first flange 424, to limit (or prevent entirely) the fastener 428 from loosening during service. In accordance with certain examples the first segment second flange 426 has an anti-rotation feature 434, such as recess conforming to tool-engagement faces of the second fastener 430 or a wire lock for rotational fixation of the second fastener 430 relative to the first segment second flange 426, to limit (or prevent entirely) the fastener 430 from loosening during service.

The second segment 422 mirrors the first segment 420 about the rotation axis 108, has an arcuate shape on its radially inner surface also conforming to the contour of the tapered portion 116 (shown in FIG. 2), and terminates at a second segment first flange 436 and an opposite second segment second flange 438. The second segment first flange 436 extends radially from the second segment 422 and is arranged to receive there the first fastener 428. The second segment second flange 438 extends radially from the second segment 422 and is arranged to receive there the second fastener 430. In certain examples the second segment first flange 436 has an anti-rotation feature 440, such as recess conforming to tool-engagement faces of the first fastener 428 or a wire lock for rotational fixation of the first fastener 428 relative to the second segment first flange 436, to limit (or prevent entirely) the first fastener 428 from loosening during service. In accordance with certain examples the second segment second flange 438 has an anti-rotation feature 442, such as recess conforming to tool-engagement faces of the second fastener 430 or a wire lock for rotational fixation of the second fastener 430 relative to the second segment second flange 438, to limit (or prevent entirely) the fastener 430 from loosening during service.

With continuing reference to FIGS. 7 and 8, the two-piece body 418 allows the clamp member 406 to be removed and replaced without disconnecting the rotary member 404 from the drive device 14 (shown in FIG. 1) and/or the driven device 16 (shown in FIG. 1), e.g., for inspection of the bearing 104. For example, upon assembly of the first segment 420 and the second segment 422 about the tapered portion 116 (shown in FIG. 2) the first fastener 428 and the second fastener 430 are tightened. Tightening the first fastener 428 and the second fastener 430 reduces diameter of the two-piece body 418, translating the clamp member 406 along the tapered portion 116 until the clamp member 406 axially abuts the bearing 104. Once the clamp member 406 comes into axial abutment with the bearing 104 further reduction in diameter of the clamp member 406, e.g., by tightening either (or both) the first fastener 428 and the second fastener 430, causes the clamp member 406 to exert the axial force component 28 (shown in FIG. 1) on the bearing 104. The axial force component 28 in turn fixes the bearing 104 between the clamp member 406 and the first collar portion 110 (shown in FIG. 2).

Figure 9:
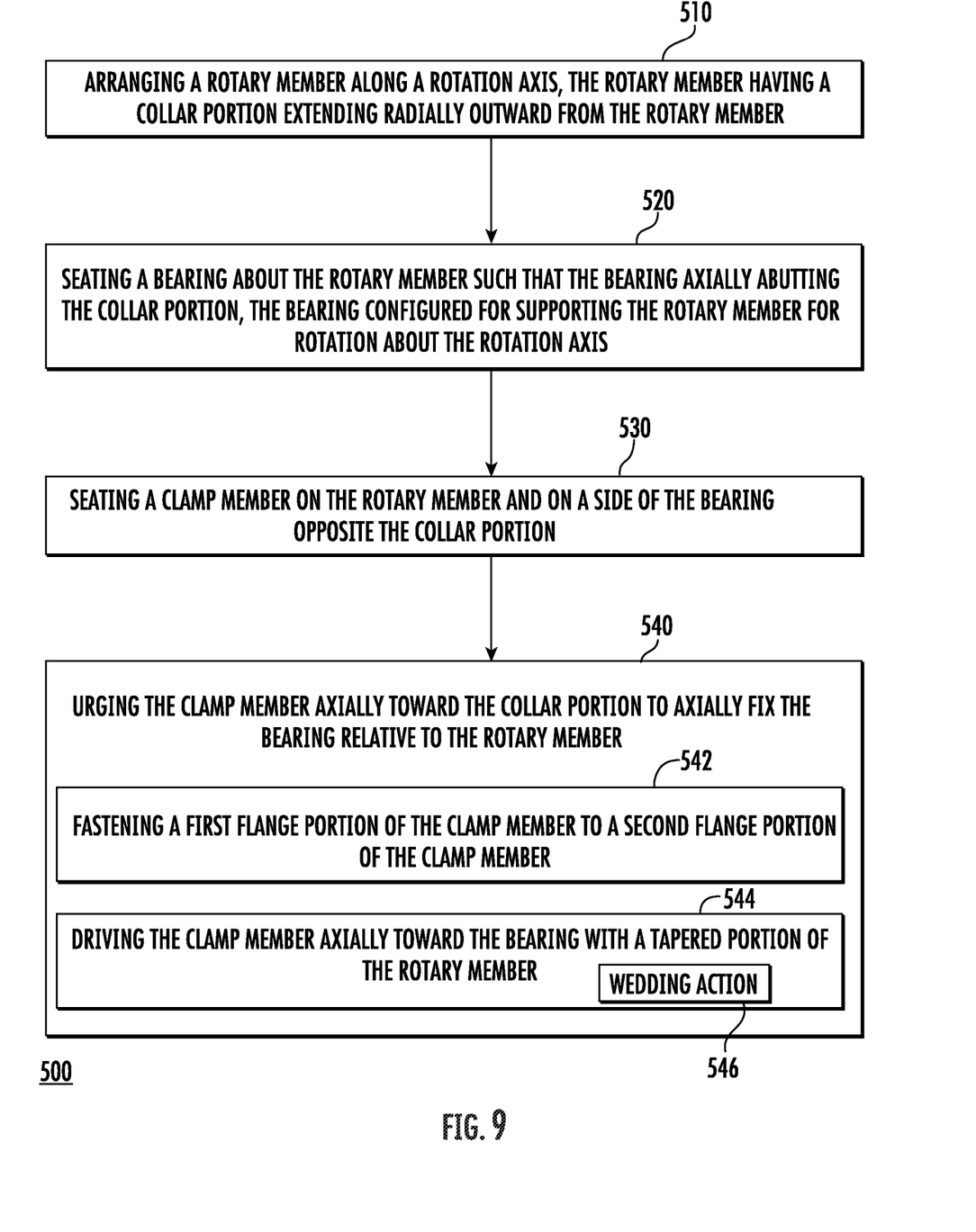
FIG. 9 is a block diagram of a method of making a bearing arrangement, showing steps of the method in accordance with an illustrative and non-limiting example of the method.

With reference to FIG. 9, a method 500 of making a bearing arrangement, e.g., the bearing arrangement 100 (shown in FIG. 1), is shown. The method 500 includes arranging a rotary member along a rotation axis, e.g., the rotary member 102 (shown in FIG. 1) along the rotation axis 108 (shown in FIG. 1), as shown with box 510. It is contemplated that the rotary member have a collar portion extending radially outward from the rotary member, e.g., the first collar portion 110 (shown in FIG. 1), as also shown with box 510.

As shown with box 520, a bearing, e.g., the bearing 104 (shown in FIG. 1), is seated about the rotary member. It is contemplated that the bearing axially abut the collar portion of the rotary member and be configured to support the rotary member for rotation about the rotation axis, as also shown by box 520. A clamp member, e.g., the clamp member 106 (shown in FIG. 1), is seated on the rotary member and on a side of the bearing opposite the first collar portion, as shown by box 530.

As shown with box 540, the clamp member is translated axially along the rotary member and toward the bearing to fix the bearing axially along the rotary structure. In certain examples translating the clamp member axially can include fastening a first tine flange to a second tine flange, e.g., the first tine flange 224 (shown in FIG. 4) to the second tine flange 230 (shown in FIG. 4), as shown with box 542. In accordance with certain examples translating the clamp member axially along the rotary member is accomplished by fastening a first segment flange to a second segment flange of the band member, e.g., the first segment flange 324 (shown in FIG. 6) and the second segment flange 332 (shown in FIG. 6), as also shown with box 542. It is also contemplated that translating the clamp member axially along the rotary member can include driving the clamp member axially with a tapered portion of the rotary member as the flanges are fastened to one another, e.g., via cooperation with the tapered portion 116 (shown in FIG. 2), as shown with box 544. This can include employing a wedging action effect to axially fix the bearing along the rotary member, as shown with box 546.

Some bearing arrangements employ a keeper nut and cup washer arrangement for axial fixation of a bearing to a rotary member. As the keeper nut is advanced along the rotary member the bearing comes into abutment with a shoulder feature defined by the rotary member and pressed thereto by the keeper nut via force communicated by the cup washer. Upon advancement of keeper nut fully, the cup washer is deformed intentionally in such a way that deformed material of cup washer sits within the groove/slot defined on the keeper nut. This restricts (or prevents entirely) rotation of the keeper nut, preventing the keeper nut from backing off such that the keeper nut retains the bearing in its axial position. While generally acceptable for its intended purpose, the threads for the keeper nut and slots for deformation of the cup are generally cut along the load path, concentrating stress and adding cost to the bearing assembly, and the cup washer is generally a single use article due the deformation that occurs upon installation.

In examples described herein a clamp member is employed to fix the bearing to the rotary member, limiting (or eliminating entirely) the need for threads and slots for the cup washer. It is contemplated that the clamp member be fastened to exert axial force for axial fixation of the bearing, allowing the clamp member to be disassembled and re-used as required and limiting the number of single-use articles employed in the bearing arrangement. In certain examples a tapered portion of the rotary member cooperates with the clamp member to prevent loosening of the bearing as well as to provide axial support (via an axial force component) to the bearing.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing arrangement, comprising:
   a rotary member arranged along a rotation axis and having a collar portion, the collar portion extending radially outward from the rotary member;
   a bearing extending about the rotary member and axially abutting the collar portion, the bearing configured to support the rotary member for rotation about the rotation axis; and
   a clamp member seated on the rotary member and on a side of the bearing opposite the collar portion, the clamp member urging the bearing axially toward the collar portion to axially fix the bearing relative to the rotary member;
   wherein the collar portion is a first collar portion and the rotary member defines a second collar portion, the second collar portion spaced apart from the first collar portion by the bearing and the clamp member,
   wherein the rotary member defines a tapered portion and a bearing seat portion between the first collar portion and the second collar portion, the tapered portion spaced apart from the first collar portion by the bearing seat portion, the tapered portion narrowing in width in a direction toward the first collar portion.

2. The bearing arrangement of claim 1, further comprising a bearing cap extending about the bearing for fixation of the bearing arrangement to a static structure.

3. The bearing arrangement of claim 2, wherein the bearing cap has a bearing cap flange portion extending radially outward from the rotation axis, axially overlapping the clamp member, and about the rotary member.

4. The bearing arrangement of claim 2, wherein the bearing cap has a fastener pattern defined therein for fixation of the bearing arrangement to the static structure.

5. The bearing arrangement of claim 1, wherein the rotary member defines no threads between the first collar portion and the second collar portion.

6. The bearing arrangement of claim 1, wherein the bearing is seated on the bearing seat portion of the rotary member, wherein the clamp member is seated on the tapered portion of the rotary member.

7. The bearing arrangement of claim 1, wherein the clamp member has a one-piece clamp body with a first tine and a second tine, the first tine fastened to the second tine of the one-piece clamp body.

8. The bearing arrangement of claim 1, wherein the clamp member has a hinged two-piece clamp body or a severed two-piece clamp body including a first segment and a second segment, the first segment of the hinged two-piece clamp body or the severed two-piece clamp body fastened to the second segment of the hinged two-piece clamp body or the severed two-piece clamp body.

9. The bearing arrangement of claim 1, wherein the clamp member has a first tine flange and a circumferentially opposite second tine flange, the first tine flange and the second tine flange extending radially from the clamp member, the second tine flange of the clamp member fastened to the first tine flange of the clamp member.

10. A bearing arrangement, comprising:
    a rotary member arranged along a rotation axis and having a collar portion, the collar portion extending radially outward from the rotary member;
    a bearing extending about the rotary member and axially abutting the collar portion, the bearing configured to support the rotary member for rotation about the rotation axis; and
    a clamp member seated on the rotary member and on a side of the bearing opposite the collar portion, the clamp member urging the bearing axially toward the collar portion to axially fix the bearing relative to the rotary member;
    wherein the rotary member has a splined end and a forked end, wherein the bearing is arranged between the splined end and the forked end.

11. The bearing arrangement of claim 10, further comprising a driven device including flight control surface connected to one of the splined end and the forked end of the rotary member.

12. The bearing arrangement of claim 10, further comprising a drive device connected to one of the splined end and the forked end of the rotary member.

13. A transmission assembly, comprising:
    a bearing arrangement as recited in claim 1; and
    a bearing cap extending about the bearing for fixation of the bearing arrangement to a static structure;
    wherein the rotary member has a splined end and a forked end, the transmission assembly further comprising:
    a drive device connected to one of the splined end and the forked end of the rotary member, the drive device including an electric or a hydraulic motor; and
    a driven device connected to the other of the splined end and the forked end of the rotary member, the driven device including a flight control surface for an aircraft.

14. A transmission assembly, comprising:
a bearing arrangement as recited in claim 1; and
a bearing cap extending about the bearing for fixation of the bearing arrangement to a static structure;
wherein the rotary member has a splined end and a forked end, wherein the bearing is arranged between the splined end and the forked end;
wherein the rotary member defines no threads between the first collar portion and the second collar portion.

* * * * *